United States Patent
Shei et al.

(10) Patent No.: US 6,175,099 B1
(45) Date of Patent: Jan. 16, 2001

(54) HOLDING OR COOKING OVEN

(75) Inventors: Steven M. Shei, Fort Wayne, IN (US); Clement J. Luebke, St. Louis, MO (US)

(73) Assignee: Duke Manufacturing Co., St. Louis, MO (US)

( * ) Notice: Under 35 U.S.C. 154(b), the term of this patent shall be extended for 0 days.

(21) Appl. No.: 09/538,761

(22) Filed: Mar. 30, 2000

Related U.S. Application Data

(63) Continuation-in-part of application No. 09/282,313, filed on Mar. 31, 1999.

(51) Int. Cl.⁷ .............. A47F 36/34; F27D 1/18; F27D 11/02
(52) U.S. Cl. .......... 219/399; 219/385; 219/428; 219/394; 99/483
(58) Field of Search .................... 219/385, 394, 219/399, 428; 99/483, 367; 222/146.5; 126/400, 332, 357 R, 359; 221/150 A

(56) References Cited

U.S. PATENT DOCUMENTS

| | | |
|---|---|---|
| 2,076,091 | 4/1937 | O'Neill . |
| 2,964,609 | 12/1960 | Anoff . |
| 3,051,582 | 8/1962 | Muckler et al. . |
| 3,313,917 | 4/1967 | Ditzler et al. . |
| 3,353,885 | 11/1967 | Tompkins . |
| 3,681,568 | 8/1972 | Schaefer ........................ 219/432 |
| 3,751,629 | 8/1973 | Eisler . |
| 3,908,749 | 9/1975 | Williams . |
| 4,024,377 | 5/1977 | Henke ............................ 219/430 |
| 4,110,587 | 8/1978 | Souder, Jr. et al. . |
| 4,198,559 | 4/1980 | Walter et al. ................... 219/430 |
| 4,235,282 | 11/1980 | Filippis et al. ................. 312/236 |
| 4,784,054 | * 11/1988 | Karos et al. ..................... 99/483 |
| 5,188,020 | 2/1993 | Buchnag ......................... 99/483 |
| 5,235,903 | 8/1993 | Tippmann . |
| 5,365,038 | 11/1994 | Mitsugu .......................... 219/386 |
| 5,496,987 | 3/1996 | Siccardi et al. . |
| 5,653,905 | 8/1997 | McKinney . |
| 5,724,886 | 3/1998 | Ewald et al. . |
| 5,783,803 | 7/1998 | Robards, Jr. . |
| 5,852,967 | 12/1998 | Fortmann et al. ............... 99/483 |
| 5,900,173 | 5/1999 | Robards, Jr. .................... 219/385 |
| 5,947,012 | * 9/1999 | Ewald et al. .................... 99/483 |
| 6,031,208 | 2/2000 | Witt et al. . |

FOREIGN PATENT DOCUMENTS 829729   3/1960   (GB) .

* cited by examiner

*Primary Examiner*—Joseph Pelham
(74) *Attorney, Agent, or Firm*—Polster, Lieder, Woodruff & Lucchesi, L.C.

(57) ABSTRACT

An oven for maintaining cooked foods at temperatures suitable for serving the foods or even for cooking foods has a cabinet containing multiple heat sinks of channel-shaped configuration. The ends of the heat sinks open out of the cabinet, so that any heat sink may receive a tray of food from either the front or back of the cabinet. The interior surface of the heat sinks generally conform to the cross-sectional shapes of the trays, so that the heat sinks lie along the bottoms and sides of the trays. The heat sinks have a heating elements extended along their sides and bottoms for elevating the temperature of the heat sinks and directing heat into the trays within the heat sinks. In addition, each heat sink also contains a cover which may close the top of the tray in the heat sink and thereby retard the escape of moisture from the tray or may vent the interior of the tray.

34 Claims, 6 Drawing Sheets

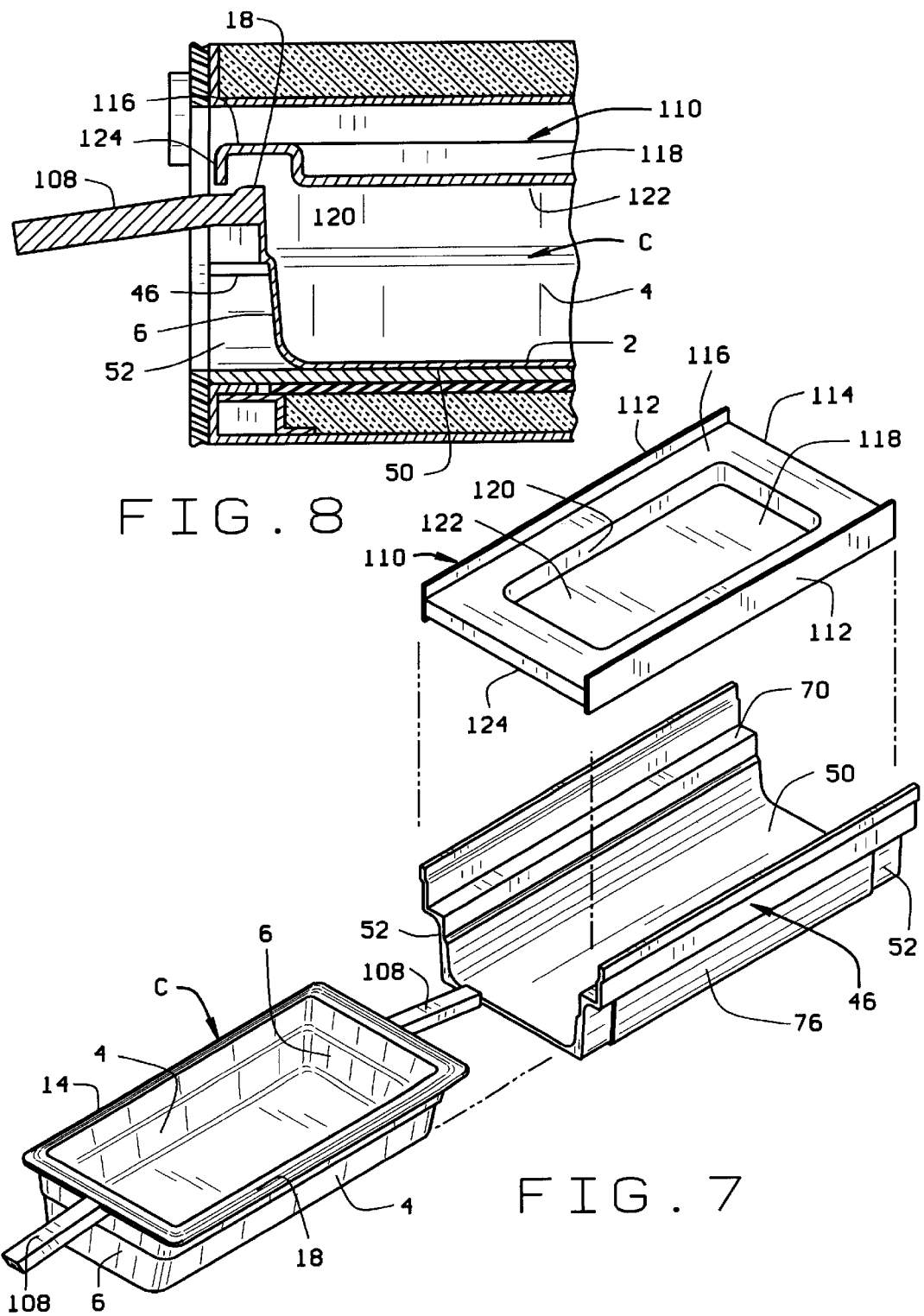

US 6,175,099 B1

HOLDING OR COOKING OVEN

CROSS-REFERENCE TO RELATED APPLICATIONS

This application is a continuation-in-part of application Ser. No. 09/282,313 filed Mar. 31, 1999.

STATEMENT REGARDING FEDERALLY SPONSORED RESEARCH OR DEVELOPMENT

Not Applicable.

BACKGROUND OF THE INVENTION

This invention relates in general to ovens and more particularly to an oven for maintaining foods at temperatures suitable for serving or for even cooking foods.

Most restaurants which specialize in serving cooked food rapidly—indeed, essentially with the placement of an order—do not have the capacity to prepare large quantities of food on demand. Thus, traditional meal times, particularly the noon hour, place severe demands on these restaurants. Typically, the so-called "fast food" restaurant will prepare some cooked food in advance of a meal time and keep that food warm in a holding oven. Then, during a meal time when the demand is greatest, it will use the food previously cooked.

Some cooked foods, such as hamburger patties, should be held at elevated temperatures only in a moist environment, since these foods, when depleted of their moisture content have poor taste and texture. Other cooked foods, such as breaded chicken or fish fillets, should be stored such that moisture may escape, so that they remain crisp. While it is convenient to store different foods at the same location, the flavor of one food should not transfer to another food. Moreover, irrespective of the food, the temperature at which it is stored must remain high enough to prevent bacterial contamination, and this generally requires holding the food at temperatures in excess of about 150° F. Holding ovens that are currently in use in fast food restaurants do not fully satisfy these requirements.

The holding ovens of current manufacture accept trays containing the cooked foods. The typical oven has a cabinet containing storage spaces which are accessible from both the front and rear of the cabinet, so that a tray containing cooked food may be placed into a storage space at one face of the cabinet and withdrawn at the other face. Each storage space has a heated platen along its top and also preferably at its bottom, and these platens transfer heat to the trays. The cabinet also contains a mechanism for closing the upper ends of the trays to prevent moisture from escaping. In one type of holding oven this mechanism resides in making the spacing between a heated platen on which the tray rests and the heated platen which overlies the tray about equal to the height of the tray, so that the upper margin of the tray lies along and essentially against the overlying platen, thus in effect closing the tray. See U.S. Pat. No. 5,724,886. Another type of holding oven supports the tray on a resilient grate which urges a tray upwardly against an overlying heated platen, thereby effecting a seal with the overlying platen. See U.S. Pat. No. 5,783,803. These ovens are difficult to clean and do not efficiently concentrate the heat at the trays where it is needed. As a consequence, the food is often held at a temperature less than optimum. Sometimes, the spaces in these ovens hold trays with their tops open and this leads to a transfer of flavors between multiple trays in any one space. In any event, ovens of current manufacture have the capacity to store foods for only very limited periods of time.

BRIEF SUMMARY OF THE INVENTION

The present invention resides in an oven having a channel-shaped heat sink which is heated by a heater. The heat sink has a storage cavity which generally conforms to the shape of a tray or other food container received in the cavity. As such, the heat sink concentrates the heat generated by the heater at the tray so as to efficiently maintain the food in the tray at a temperature suitable for serving. The heat sink may have a cover for closing the top of the tray within it. Where the oven contains multiple heat sinks, these heat sinks are isolated from each other to prevent the flavor of the food in one from transferring to food in another.

BRIEF DESCRIPTION OF THE SEVERAL VIEWS OF THE DRAWINGS

In the accompanying drawings which form part of the specification and wherein like numerals and letters refer to like parts wherever they occur:

FIG. 7 is an exploded perspective view of the heat sink, a modified cover for the heat sink, and a modified tray; and FIG. 8 is a fragmentary longitudinal sectional view of the modified tray of FIG. 7 fitted beneath the modified cover of FIG. 7.

Corresponding reference numerals will be used throughout the several figures of the drawings.

DETAILED DESCRIPTION OF THE INVENTION

Figure 1:
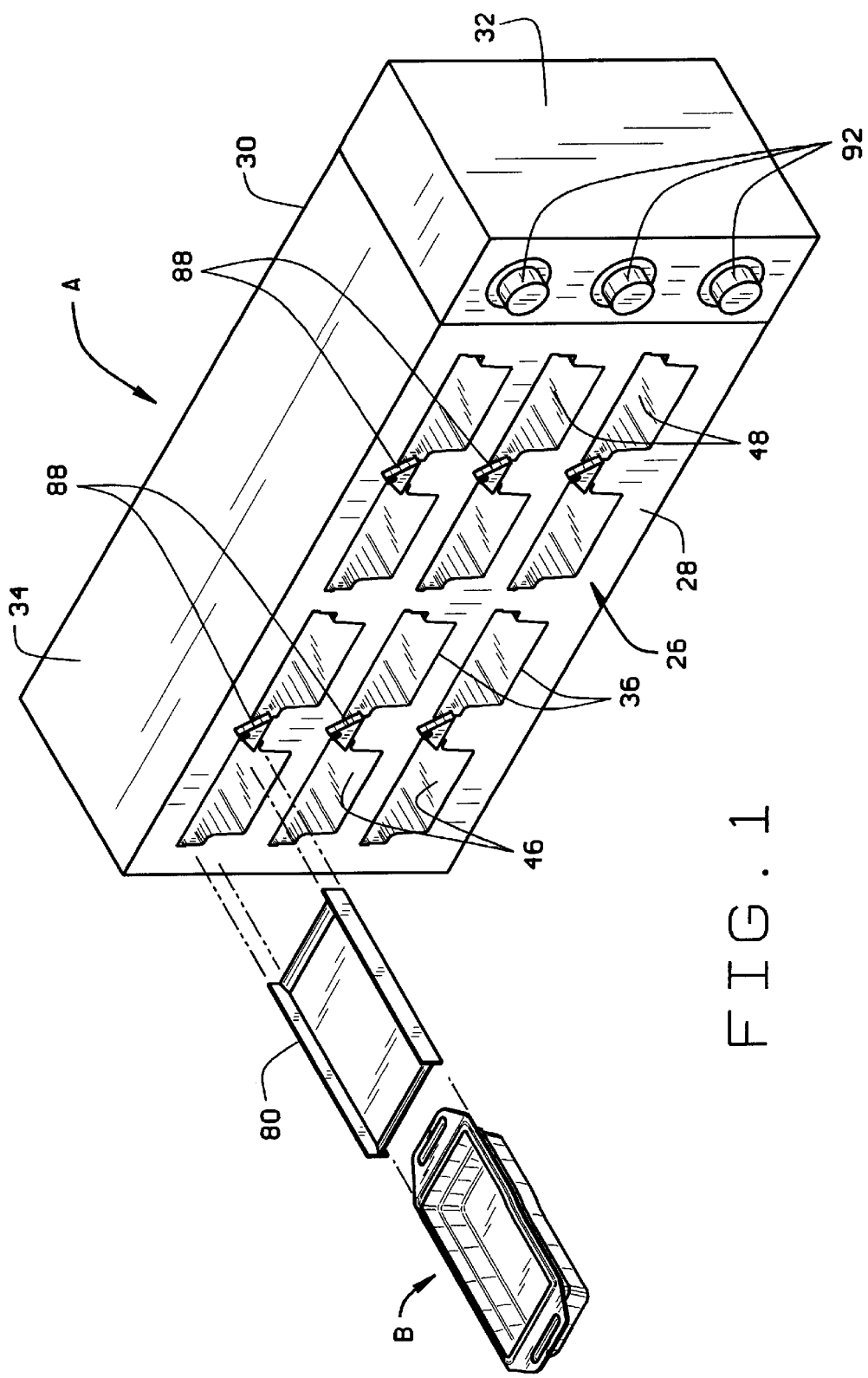
FIG. 1 is a front and top perspective view of a holding oven constructed in accordance with and embodying the present invention, with one of the covers and one of its trays shown removed.
Figure 2:
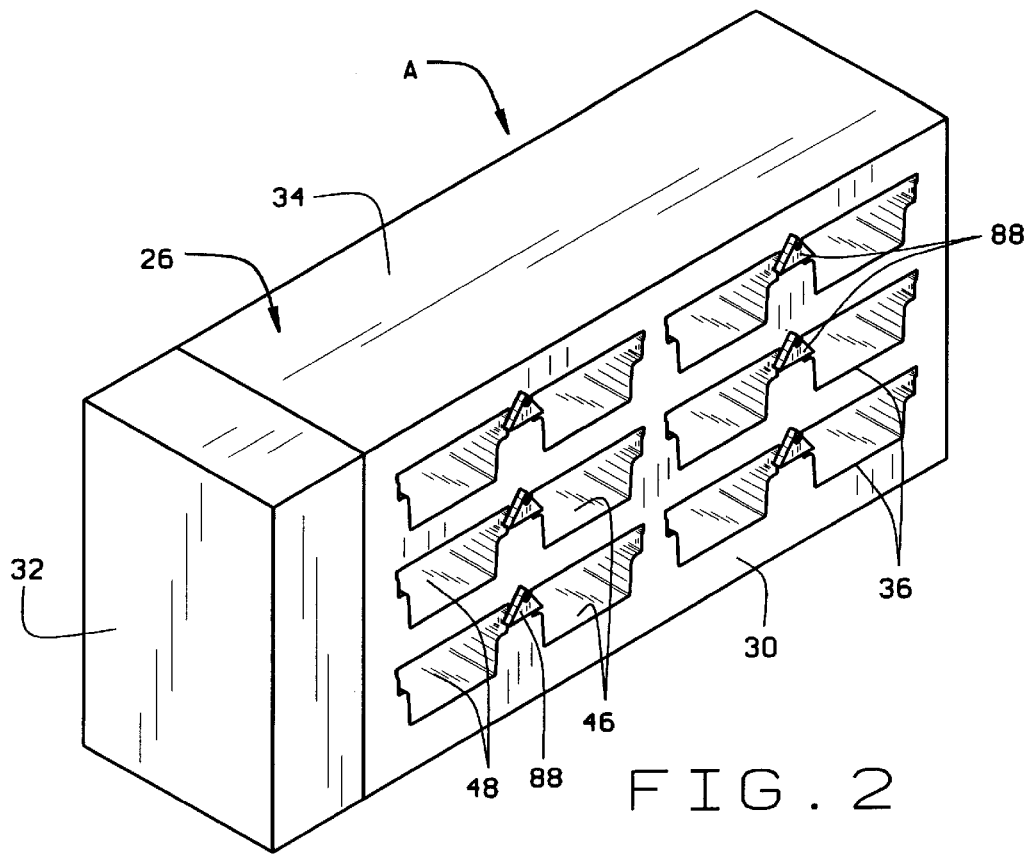
FIG. 2 is a top and rear perspective view of the oven.

Referring now to the drawings, an oven A (FIGS. 1&2) holds multiple trays B in which precooked food is placed and held for limited times, indeed, several hours in the case of some foods. The oven A and the trays B, which are used with it, will accommodate a variety of foods typical of those served in fast food restaurants. Among those foods are cooked hamburger patties, ham, bacon, sausage, onion rings, French toast, fish fillets, chicken fillets and biscuits. Thus, the trays B constitute food containers. The oven A heats the trays B from their bottoms as well as their sides. Moreover, one who places a tray B in the oven A has the option of closing the top of the tray B so as to retain moisture in the tray B or leaving the top open so that moisture may escape from the tray B.

Figure 3:
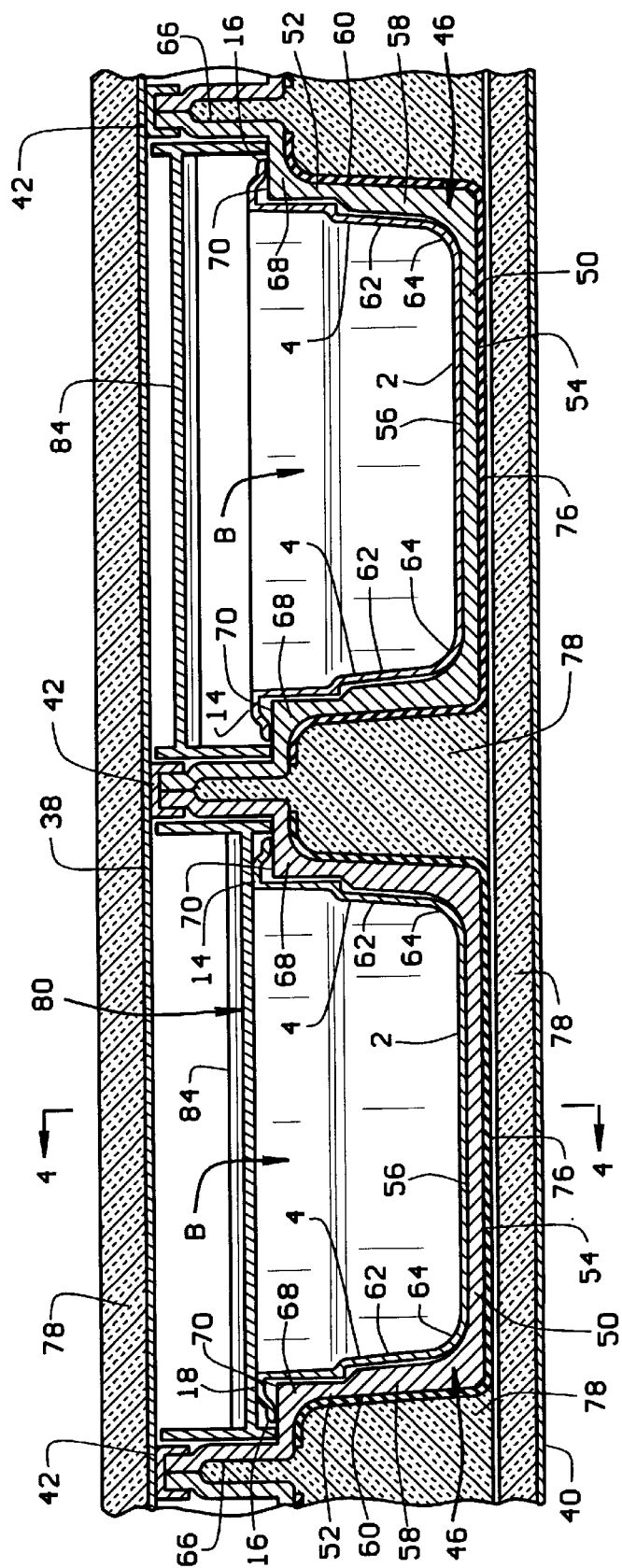
FIG. 3 is a transverse sectional view of two heat sinks, one having its cover in its sealing position and the other having its cover in the venting position.
Figure 4:
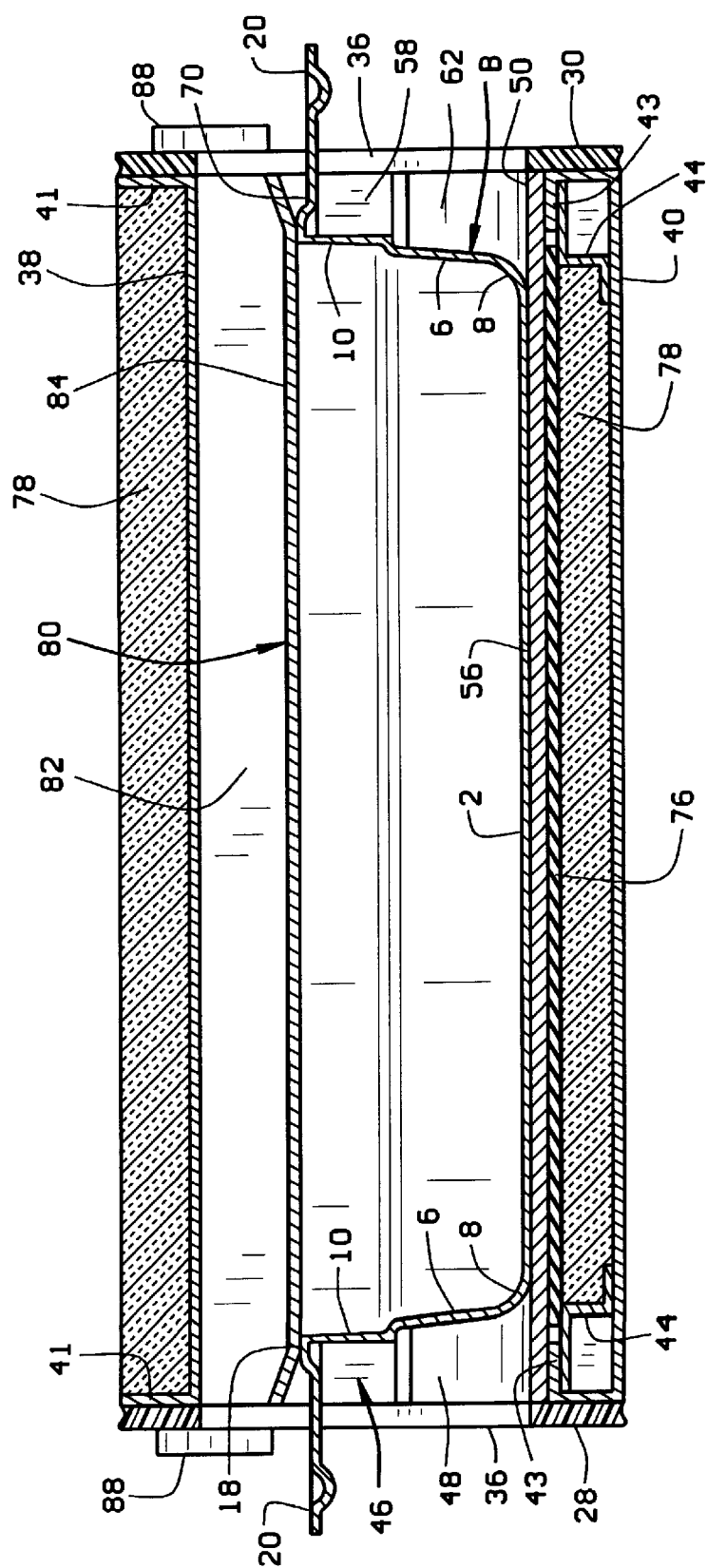
FIG. 4 is a fragmentary sectional view taken along line 4—4 of FIG. 3.
Figure 5:
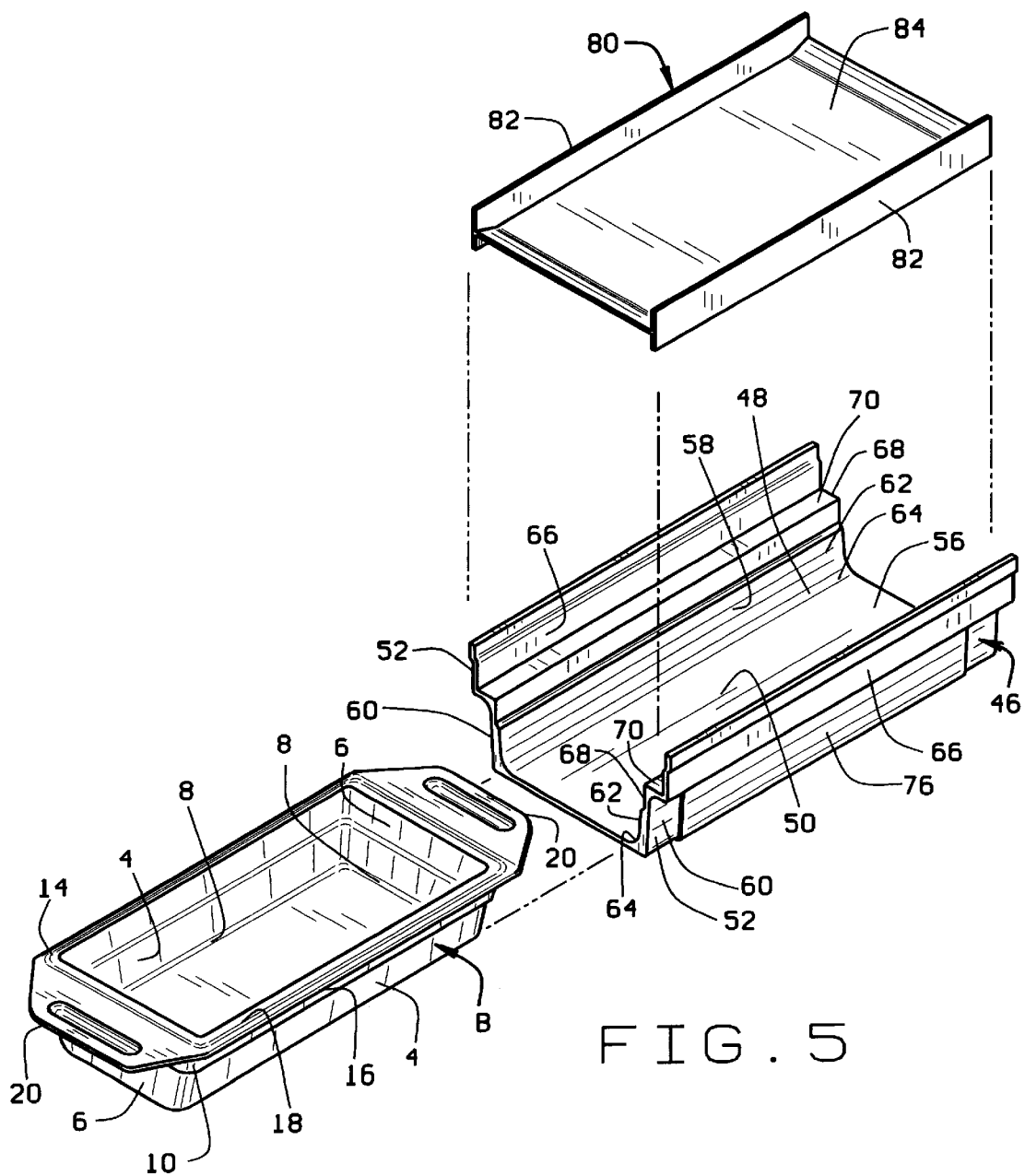
FIG. 5 is an exploded perspective view of a heat sink, the cover for the heat sink, and a tray.

Considering the trays B first, they are preferably molded from a polymer that is capable of withstanding the temperatures maintained in the oven A, although trays B of stamped metal will suffice as well. In any event, such a tray B has (FIGS. 3–5) a flat bottom wall 2 and also side walls 4 and end walls 6 that merge with the bottom wall 2 at corners 8 of generous radius. The side walls 4 and end walls 6 flare outwardly slightly and each has an offset portion 10 near its upper end. The offset portions 10 of the walls 4 and 6, along their upper margins, merge into a rim in the form of a peripheral lip 14 which projects laterally outwardly and, beyond the side walls 4, turns slightly downwardly at a depressed edge 16 (FIG. 3). The lip 14 has a flat upper surface 18 that lies in a common plane along the entirety of the lip 14. At the end walls 6 the lip 14 merges into handles 20 which lie below the plane of the upper surface 18. Similar trays see widespread use in fast food restaurants.

The oven A includes (FIGS. 1&2) a cabinet 26 having a front panel 28, a rear panel 30, end panels 32, and a top panel 34. The front panel 28 and rear panel 30 contain openings 36 which conform generally to the cross-sectional configuration of the trays B, but are slightly wider and somewhat taller. The openings 36 are arranged in several tiers, and for every opening 36 in the front panel 28 an opening 36 in the rear panel 30 aligns with it. The cabinet 26 at each tier of openings 36 also has (FIGS. 3 and 4), an upper pan 38 that extends through it above the openings 36 and a lower pan 40 that extends through it below the openings 36. The upper pan 38 has a peripheral lip 41 which projects upwardly and imparts rigidity to the pan 38. The pan 38 carries channels 42 which extend between the front and rear panels 28 and 30 in the regions between the openings 36. More channels 42 lie beyond the two endmost openings 36 as well. The channels 42 are attached firmly to the pan 38 and open downwardly. The lower pan 40 for each tier has lips 43 that project upwardly and turn inwardly and, beneath the inwardly turned portions, has rigidifying members 44. The space between the upper and lower pans 38 and 40 for each tier of openings 36 is occupied by several heat sinks 46—one for each pair of aligned openings 36 in the tier.

Each heat sink 46 is formed from a substance that conducts heat well, aluminum being preferred. When formed from aluminum, the heat sinks 46 may be produced as extrusions or castings or they may even be produced by machining. Irrespective of how it is produced, each heat sink 46 possesses (FIG. 5) a channel-like configuration in that it is open at both ends and at its top and closed along its two sides and bottom. This leaves the heat sink 46 with a cavity 48 that extends the full length of the heat sink 46. The open ends of the cavity 48 align with openings 36 in the front and rear panels 28 and 30 of the cabinet 26, so that the cavity 48 of the heat sink 46 is easily accessible from the exterior of the oven A. The cavity 48 generally conforms to the exterior cross-sectional configuration of any tray B.

More specifically, each heat sink 46 includes (FIGS. 3&5) a bottom wall 50 and side walls 52 which are formed integral with the bottom wall 50 and project upwardly from it. The bottom wall 50 is of uniform thickness, it being about ³⁄₁₆ in. thick, and has a flat bottom surface 54 and a flat top surface 56. In contrast, the two side walls 52, while being mirror images of each other, have somewhat varied thickness. Each side wall 52 has a lower region 58 that generally corresponds in height to the height of a tray B. The lower region 58 has a flat outside surface 60 and a contoured inside surface 62 that merges with the flat top surface 56 of the bottom wall 50 at a curved corner 64. Immediately above the corner 64, the inside surface 62 flares outwardly slightly, then after undergoing a more abrupt change in direction, extends vertically for a lesser distance. The spacing between the inside surfaces 62 for the side walls 52 of the heat sink 46 is slightly greater than the width of the tray B measured across of the outside surfaces of its side walls 4. Moreover, the inside surfaces 62 of the side walls 52 on the heat sink 46 generally conform in configuration to the outside surfaces for the side walls 4 of the tray B. When the tray B is inserted into the heat sink 46 with the bottom wall 2 of the tray B resting in the flat top surface 56 of the bottom wall 50 for the heat sink 46, the side walls 4 of the tray B, despite their contoured configuration, are close to the inside surfaces 62 on the side walls 52 of the heat sink 46. Generally, the spacing at any elevation between the inside surfaces 56 on side walls 52 of the heat sink 46 should be no more than about 1.0 in. larger than the spacing between the side walls 4 of the tray B at the outside surfaces of those side walls 4. Thus, when the tray B is centered in the cavity 48 of the heat sink 46, a clearance of no more than about 0.5 in. exists between the inside surfaces 62 of the side walls 52 for the heat sink 46 and the outside surfaces in the side walls 4 of the tray B. Preferably, when the tray B is centered, the clearance is about 0.015 in. The curved corners 64, where the flat bottom surface 54 and contoured inside surfaces 62 of the heat sink 46 merge, lie opposite, yet close to, the corners 8 of the tray B.

The lower region 58 of each side wall 52 for the heat sink 46 merges into an upper region 66 at an offset 68. The upper regions 66 extend vertically and by reason of the offsets 68, the spacing between the upper regions 66 exceeds the spacing between the lower regions 58. Indeed, that spacing exceeds the width of the tray B at its peripheral lip 14. The contoured inside surfaces 62 on the lower regions 58 of the side walls 52 rise to flat horizontal shoulders 70 which extend over the offsets 68 and out to the upper regions 66. The shoulders 70 lie in a plane that is parallel to the top surface 56 of the bottom wall 52, and the distance between the shoulders 70 and the top surface 56 is slightly less than the distance between the lower surface of the bottom wall 2 for the tray B and the undersurface of the lip 14 at the side walls 4 which undersurface is at the depressed edge 16. Thus, when the tray B rests on the bottom wall 2 of the heat sink 44, the depressed edge 16 of the lip 14 beyond each side wall 4 lies slightly above the shoulders 70. The lip 14 remains well below the upper edges of side walls 52 for the heat sink 46.

Those upper edges lie along the upper regions 66 of the side walls 52 for the heat sink 46, and here the upper regions 66 are enlarged slightly and received in the channels 42 that are attached to the upper pan 38 for the tier in which the heat sink 46 lies (FIG. 3). The bottom wall 50 of the heat sink 46 at its ends rests on the inwardly turned portions of the lips 43 for the lower pan 40. (FIG. 4) to which it is fastened. Thus, the heat sinks 46 for any tier are captured between the upper and lower pans 38 and 40 for the tier. The channels 42 confine the heat sinks 46 of the tier laterally, whereas the front and rear panels 28 and 30 confine them longitudinally. In short, the heat sinks 46 are fixed in position in the cabinet 26.

Each heat sink 46 is fitted with a heater which may take the form of a flexible heating element 76 of the electrical resistance type. It extends almost the full length of the heat sink 44, covering the flat bottom surface 54 of the bottom wall 50, the corners between the bottom wall 50 and side walls 52, and the flat outside surfaces 60 on the lower regions 58 of the side walls 52. It even curves outwardly along the bottom surfaces of the offsets 68 in the side walls 52. To these surfaces the heating element 76, which is preferably film-etched, is bonded, preferably with a silicone adhesive capable of withstanding the elevated temperatures produced by the heating element 76. In this regard, the heating element 76 should produce enough heat and reach a temperature high enough to elevate the temperature of the heat sink 46 along the top surface 56 of its bottom wall 50 and along the contoured inside surfaces 62 of its side walls 52 to a temperature suitable for maintaining food within the tray B that occupies that heat sink 46 at any desired temperature. Where the oven A serves as a holding oven, that temperature keeps the food warm enough for serving and warm enough to prevent bacterial contamination. Where the oven A functions as a cooking oven, that temperature is hot enough to actually cook the food.

Other types of heaters may be used as well. For example, the heater may take the form of resistance type heating rods embedded in the bottom wall 50 and in the lower regions 58 of the side walls 52. Steam or hot water may be circulated through channels in the bottom wall 50 and lower regions 58 of the side walls 52 to maintain the heat sink 46 at an elevated temperature, in which case the channels and the fluid that flows within them become the heater. On the other hand, if the heat sink 46 is formed from a ferrous material, an induction heating device may be used to elevate the temperature.

Behind the side walls 52 of each heat sink 46 and beneath its bottom wall 50, as well, the cabinet 26 is packed thermal insulation 78. The lower pans 40 in the cabinet 26 support the insulation 78 and prevent the insulation 78 for any one tier of heat sinks 46 from dropping into the heat sinks 46 of the tier below.

In addition to its heating element 78, each heat sink 46 is equipped with a cover 80 that rests on the shoulders 70 of its offsets 68 and generally occupies the space between the upper regions 66 of its side walls 52. The cover 80 includes a pair of vertical legs 82 and a cross wall 84 that extends between and is attached to the vertical legs 82. Indeed, the cross wall 84 is joined to the vertical legs 82 between the longitudinal edges of the legs 82, it being offset closer to one longitudinal edge of each leg 82 than the other. However, near its ends the cross wall 84 flares away from the edges to which it is closest. The width of the cross wall 84 slightly exceeds the width of the tray B at its lip 14. The height of the vertical legs 82 is slightly less that the height of the upper regions 66 of the two side walls 52 for the heat sink 44. These dimensions enable one to easily slide the cover 80 into and out of the upper region of its heat sink 44.

The configuration of the cover 80 is such that it may assume two positions within the space between the upper regions 66 of the side walls 52 for the heat sink 44—a closing position (FIG. 3-left) and a venting position (FIG. 3-right). In the closing position the cross wall 84 of the cover 80 rests on the upper surface 18 of the lip 14 of the tray B, or else lies slightly above the upper surface 18 of the lip 14. In either arrangement the cross wall 84 serves as a closure for the tray B. Where the cross wall 84 actually rests on the lip 14 the legs 82 project downwardly almost to the flat horizontal shoulders 70 of the heat sink 46, but do not contact the shoulders 70. The lower margins of the legs 82 lie between the lips 14 on the tray B and the upper regions 66 of the side walls 52 for the heat sink 46. When the tray B is removed from the heat sink 46, the legs 82 of the cover 80 drop downwardly and rest on the shoulders 70 of the heat sink 46. But the ends of the cross wall 84 flare upwardly, leaving enough space between the shoulders 70 and those flared ends to accommodate the handles 20 of a tray B. On the other hand, where the cross wall 84 lies slightly above the upper surface 18 on the lip 14, the legs 82 project downwardly to and actually rest on the flat horizontal shoulders 70 of the heat sink 46 with the lip 14 on the tray B being between the regions of contact. A clearance ranging up to 0.375 in. exists between the bottom of the cross wall 84 and the upper surface 18 on the lip 14. The legs 82 extend up to and nearly contact the overlying upper pan 38 of the cabinet 26. In the venting position the cover 80 is reversed.

Its legs 82 rest on the shoulder 70 of the heat sink 46 outwardly from the peripheral lip 14 of the tray B, but the cross wall 84 lies well above the peripheral lip 14 and the handles 20. This leaves an open space of at least 0.375 in. between the cross wall 84 of the cover 80 and upper surface 18 on the lip 14 of the tray B at each end wall 6 of the tray B, and moisture from the tray B may escape through these spaces.

At the sides of the openings 36 in the front panel 28 and rear panel 30, the cabinet 26 is fitted with pivotal stops 88 of the triangular configuration. Each triangular stop 88 serves two openings 36. It pivots at one of its apices, with the pivot axis being slightly above, but otherwise between, the two openings 36 that the stop 88 serves. The other two apices project beyond the upper regions 66 of the nearby side walls 52 for the heat sinks 46 at those openings 35. As such, those other apices project past the ends of the openings 36, but not across, the openings 36.

The free apices of the stops 88 lie beyond the ends of the vertical legs 82 for the covers 80 and retain the covers 80 in the upper regions of the heat sinks 46. However, to reverse a cover 80 and thereby change its position, the stop 88 at the heat sink 46 in which the cover 80 fits, is pivoted away from the opening 36 at that heat sink 46 so as to no longer block the opening 36. While the stop 88 is held away from the opening 36, the cover 80 is removed and reversed. Then the cover 80 is inserted back through the opening 36 in the reversed position. Once the cover 80 is fully within the heat sink 44, the stop 88 is released, and it assumes its normal position, blocking the end of the opening 36 and thereby retaining the cover 80 in the heat sink 46.

Finally, the cabinet 26 contains electrical controls 92 which control the temperature at which the heating elements 78 of the sinks 46 operate. A separate control 92 exists for each tier of heat sinks 44. However, the controls 92 may be such that each heat sink 46 is controlled individually.

The oven A normally awaits use in a restaurant with some of its covers 80 in the sealing position and the remainder of its covers 80 in the venting position. As a meal time approaches, the employees of the restaurant cook various foods for which the restaurant expects to receive orders during the meal time. Immediately after these foods are prepared, they are placed in the trays B, each food being assigned to a different tray B. Some of these foods, such as hamburger patties, loose their taste and texture with loss of moisture. Others, such as fried chicken fillets, biscuits, and eggs become soggy if stored in an abundance of moisture. The trays B which contain foods that must remain moist are placed in heat sinks 44 having their covers 80 in the closing position (FIG. 3-left). The trays B containing foods which must remain crisp are placed in heat sinks 44 in which the covers 80 are in the venting position (FIG. 3-right). Each heat sink 44 directs heat through the bottom wall 2 and side walls 4 of the tray B that is within it, and the heat keeps the food in the tray B warm—indeed, warm enough to prevent bacterial contamination and warm enough to serve to patrons of the restaurant when the demand arises, all with the flavor and texture preserved.

To insert a tray B into a heat sink 44 having its cover 80 in the closing position, the restaurant employee brings the tray B to the rear panel 30 of the cabinet 26 and aligns it with one of the openings 36 at a heat sink 46, the cover 80 for which is in its closing position. The employee inserts the handle 20 of the tray B beneath the upwardly flared end on the cross wall 84 for the cover 80 in that heat sink 46. Thereupon, the employee advances the tray B into the heat sink 46, with the lip 14 of the tray B passing beneath the cross wall 84 of the cover 80. When the tray B is fully within the heat sink 46, the cross wall 84 of the cover 80 establishes a closure over the open top of the tray B and that wall 84 lies over the entire lip 14 along the periphery of the tray B. Moisture remains trapped within the tray B, even though the heat which is supplied by the heat sink 46 has the capacity to drive moisture from the food. As a consequence, the food in the tray B retains its taste and texture.

On the other hand, if the tray B contains a food which must remain crisp, the employee selects a heat sink 46 which has its cover 80 in the venting position. The tray B when aligned with the opening 36 for this heat sink 46 passes easily into the cavity 48 of the heat sink 46 with little manipulation, its lip 14 passing over the shoulders 70 of the heat sink 46 and its bottom wall 2 over the top surface 56 for the bottom wall 50 of the heat sink 46. The cross wall 84 for the cover 80 remains well above the lip 14 on the tray B, so that moisture from the food within the tray B may escape at the open ends of the cover 80, that is to say over the end walls 6 of the tray B and beneath the cross wall 84 of the cover 80.

When the demand for a particular food arises within the restaurant, other employees remove the tray B containing that food from the oven A. This simply involves grasping the tray B by one of its handles 20 and withdrawing it from its heat sink 46. In this regard, the handles 20 project beyond the front and rear panels 28 and 30 of the cabinet 26 and are easily accessible.

Any cover 80 is easily withdrawn from its heat sink 46 by pivoting the stop 88 at the one end of the heat sink 46 away from the opening 36 at the end of that heat sink 46. This leaves the cavity 48 of the heat sink 46 unobstructed, and it is easily cleaned, owing to its continuous and smooth surfaces. It also enables an employee to easily clean the cover 80. And, of course, it permits the employee to reverse the position of the cover 80.

The heat sink 46 efficiently transfers heat from its heating element 76 to the tray B, thereby keeping the contents of the tray B at a desired temperature with minimum expenditure of electrical energy. The foods in the tray B that are withdrawn, even as long as several hours after being inserted into the oven A, have essentially the taste and texture that they possessed immediately after being cooked. Since the trays B are totally isolated from each other in the cabinet 26, even when the covers 80 over those trays are in their venting positions, flavors are not transferred between the foods in different trays B.

Figure 6:
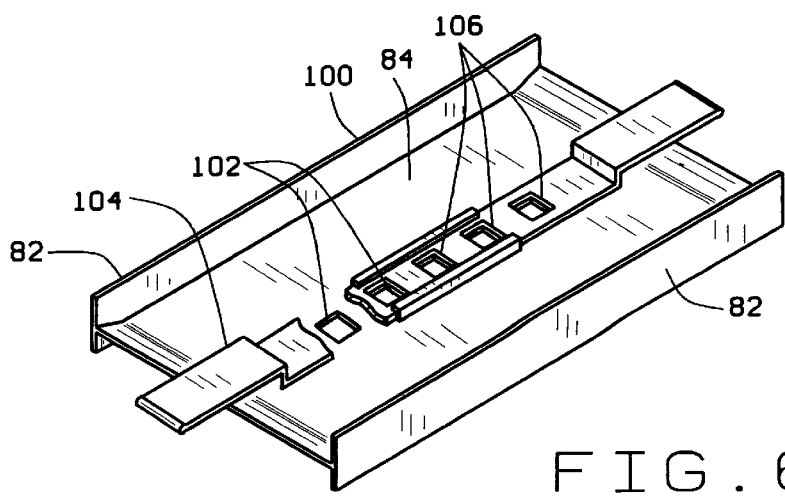
FIG. 6 is a perspective view of a modified cover.

A modified cover 100 (FIG. 6) has side legs 82 and a cross wall 84 of essentially the same configuration as their counterparts in the cover 80. However, the cross wall 84 contains openings 102 arranged in a row between the legs 82. It also carries a slide 104 which likewise contains openings 106. The slide 104 is captured on the cross wall 84 such that it cannot be lifted from the cross wall 84, yet it can slide longitudinally over the wall 84. Indeed, the slide 104 projects beyond the ends of the cross wall 84, so that it can be manipulated from the exterior of the oven A to assume various positions on the cross wall 84. In one position, the slide completely covers the openings 102 in the wall 84, and in this position the tray B is sealed. In other positions the slide 104 exposes the openings located within and being joined to the elevated region 116. The depressed region 118 has a peripheral wall 120 that is generally vertical and a bottom wall 122 which lies below, yet parallel to, the surrounding elevated region 116.

When the tray C is in the cavity 48 of the heat sink 46 (FIG. 8), the bottom surface of the elevated region 116 in the cross wall 114 lies directly above the upper surface 18 on the tray B, there being a gap of about 0.375 in. between the two surfaces. The peripheral wall 120, on the other hand, is set inwardly from the upper surface 18 of the tray C and inwardly from the upper ends of the side walls 4 and end walls 6 as well, with the gap being about 0.375 in. The lower surface of the bottom wall 122 lies in a horizontal plane that is slightly above the plane defined by the upper surface 18 on the tray C, with the spacing between the two planes being about 0.01 in. This spacing allows the tray C to be inserted into and removed from the cavity 48 of the heat sink 46 without interference from the cover 110.

At the ends of the cover 110 the elevated region 116 of the cross wall 114 turns downwardly in the form of a vertical lip 124, the lower edge of which lies in the plane of the lower surface on the bottom wall 122. When the tray C is in the heat sink 46, the lips 124 lie slightly beyond the upper surfaces 18 at the ends of the tray C, yet over or slightly beyond the depressed edges 16 at those ends. The lips 124 and the nearby segments of the peripheral wall 120 for the depressed region 118 create labyrinths which retard moisture from escaping from the tray C.

To enhance the seal established by the lips 124 and the depressed region 118 of the cover 110, the lips 124 may be fitted with elastomeric seal elements which bear against the end edges of the laterally directed lip 14 of the tray C beyond the two end walls 6 of the tray C. Likewise, elastomeric lip seals may also be fitted to the ends of the cross wall for the cover 80 to contact the lip 14 at the ends of the tray C and thereby enhance the sealing capabilities of the cover 80.

The rear panel 30 of the cabinet 26, in lieu of having openings 36, may be solid. In such an arrangement the rear panel 30 would block one end of the cavity 48 for each heat sink 46, and the heat sink 46 itself could wrap around the end of the cavity to close it and thus, transfer heat to that end wall 6 of the tray B which is presented toward the closed end. The other end of the heat sink 46 would remain open and indeed would open out of the cabinet 36 through the aligned opening 36 in the front panel 28. Of course, the handle 20 on that end of the tray B which faces the closed end of the heat sink 46 would have to be removed or reconfigured, so that it will not interfere with the solid rear panel 30.

Also, any tray B or C which must retain moisture may be fitted with a separate cover, and that would eliminate the need for the covers 80 or 110. In this regard, covers are available on the market for the traditional trays that resemble the trays B and C.

This invention is intended to cover all changes and modifications of the example of the invention herein chosen for purposes of the disclosure which do not constitute departures from the spirit and scope of the invention.

What is claimed is:

1. An oven for heating foods, said oven comprising: a heat sink having a bottom wall and side walls which define a cavity in which food is placed; the cavity having ends, at least one of which opens out of the heat sink; a heater for heating the heat sink so that heat applied to the heat sink is transferred to the food in the cavity of the heat sink; and a cover located over the cavity.

2. An oven according to claim 1 wherein the cavity at both of its ends opens out of the heat sink.

3. An oven according to claim 2 wherein the cover is located between the side walls of the heat sink.

4. An oven according to claim 3 wherein the side walls of the heat sink have horizontal shoulders that are presented upwardly, and the cover extends over the shoulders so that it may be supported on the shoulders.

5. An oven according to claim 4 wherein the cover is capable of assuming first and second positions in the heat sink, the cover when in the both positions extending over the cavity, but when in the first position extending over the cavity at an elevation less than when in the second position.

6. An oven according to claim 5 wherein the cover has generally vertical legs which lie over the shoulders on the heat sink and a generally horizontal cross wall that extends between the legs.

7. An oven according to claim 1 wherein the heater includes an electrical resistance heating element that is located along the side walls and the bottom wall of the heat sink.

8. The combination comprising: a heat sink formed from a good conductor of heat and having a bottom wall and side walls that extend upwardly from the bottom wall and together with the bottom wall define a cavity having ends, at least one of which opens out of the heat sink; a heating element on the heat sink for elevating the temperature of the heat sink; and a food container located in the cavity of the heat sink, the food container having a bottom wall that is located along the bottom wall of the heat sink, side walls that extend upwardly from the container bottom wall and are located along the side walls of the heat sink, and end walls that extend upwardly from the container bottom wall and connect the container side walls, whereby heat from the heat sink is transferred to the food container.

9. The combination according to claim 8 wherein at any elevation the spacing between the interior surfaces of the side walls for the heat sink and the side walls of the food container is no more than about 0.5 inches when the food container is centered between the side walls of the heat sink.

10. The combination according to claim 8 wherein container is a tray having an open top; and wherein the combination further comprises a cover mounted on the heat sink and extended over the open top of the tray.

11. The combination according to claim 10 wherein the tray has a rim located on its side and end walls and extending around the open top of the tray; and wherein the cover extends over the rim.

12. The combination according to claim 11 wherein the bottom wall of the tray rests on the bottom wall of the heat sink, and the side walls of the tray lie close to the side walls of the heat sink.

13. The combination according to claim 12 wherein at any elevation the spacing between the interior surfaces of the side walls for the heat sink is no more than 1.0 inch greater than the spacing between the exterior surfaces of the side walls for the tray.

14. The combination according to claim 12 wherein the rim of the tray projects beyond the side and end walls of the tray in the form of a peripheral lip and the cover extends over the lip.

15. The combination according to claim 13 wherein each side wall of the heat sink has an upwardly presented shoulder and the peripheral lip extends over the shoulders; and wherein the cover is configured to assume a closing position in which it is located immediately over, yet spaced slightly from, the tray lip, and a venting position in which it rests on the shoulders of the side walls for the heat sink and is separated from the tray lip, with the separation being substantially greater than the spacing between the cover and the tray lip when the cover is in its closing position.

16. The combination according to claim 14 wherein the cover contains a slide which moves between a closed position and an open position; and wherein the interior of the tray is vented when the slide is in its open position.

17. The combination according to claim 14 wherein the tray has handles which project beyond its end walls and beyond the ends of the heat sink.

18. The combination according to claim 14 wherein the cover has a cross wall that extends across the cavity, and the cross wall has an elevated region located over the rim of the tray and a depressed region surrounded by the elevated region and located below the elevated region.

19. The combination according to claim 18 wherein the cover further has lips extended downwardly from the elevated region of the cross wall and spaced from the ends of the depressed region.

20. In combination with a tray having a bottom wall and an upwardly opening interior that is enclosed at least by side walls and, where it opens upwardly, is surrounded by a rim that is located on the side walls, an oven for keeping contents of the tray warm, said oven comprising: a cabinet; a heat sink located within the cabinet, the heat sink being formed from a good conductor of heat and having a channel-shaped configuration which provides a cavity in which the tray is received, with the spacing between the tray and the sides of the heat sink not exceeding 0.5 inches when the tray is centered in the cavity, the cavity of the channel-shaped heat sink having at least one open end that opens out of the cabinet; and a heating element on the heat sink for elevating the temperature of the heat sink and thereby transferring heat to the tray that is in the heat sink.

21. The combination according to claim 20 and further comprising a cover located over the tray and being capable of closing the open top of the tray to retain moisture in the tray.

22. The combination according to claim 20 wherein the cover may assume a closing position in which it rests on the rim of the tray or a venting position in which it is separated from the rim of the tray.

23. The combination according to claim 20 wherein the cover may assume a closing position in which it is located in close proximity to the rim of the tray and a venting position in which it is spaced farther from the rim on the tray.

24. The combination according to claim 20 and further comprising a stop located on the cabinet where it blocks removal of the cover from the heat sink, but not removal of the tray.

25. The combination according to claim 20 wherein the channel-shaped heat sink has two open ends, each of which opens out of the cabinet.

26. The combination according to claim 20 wherein the heat sink has shoulders which extend laterally from the cavity; and wherein the cover includes legs which are located over the shoulders and a cross wall which extends between the legs and over the cavity.

27. The combination according to claim 26 wherein the cover is reversible in the heat sink so that it may assume a closing position or a venting position, the legs of the cover resting on the shoulders and the cross wall being spaced upwardly from the rim of the tray when the cover is in its venting position, the legs of the cover being over the shoulders and the cover being closer to the rim when the cover is in its closing position.

28. The combination according to claim 26 wherein the cross wall contains an elevated region that lies directly above the rim of the tray and a depressed region that is surrounded by the elevated region, yet lies at an elevation above the rim of the tray.

29. The combination according to claim 28 wherein the cover further has lips extended downwardly from the elevated region of the cross wall and are spaced from the ends of the depressed region.

30. A cover for a food-containing tray that fits within a heat sink having shoulders for supporting the cover generally above the tray, said cover comprising: a pair of vertical legs, each provided with parallel first and second horizontal edges; and a cross wall joined along its sides to the legs closer to the first edges of the legs than to the second edges of the legs and extending between the legs.

31. A cover according to claim 30 wherein the cross wall contains openings, and further comprising a slide mounted on the cross wall and having openings, the slide being movable on the cross wall between positions in which the openings in the slide expose the openings in the cross wall and a position in which the slide closes the openings in the cross wall.

32. A cover according to claim 30 wherein the cross wall has an elevated region along which it is joined to the legs and a depressed region which is set inwardly from the sides and the ends of the cross wall.

33. A cover according to claim 32 wherein the cross wall at its ends has lips which turn downwardly and are spaced from the depressed region.

34. A cover according to claim 30 wherein the cross wall at its ends flares toward the second edges of the legs.

* * * * *